United States Patent
Desjardins-Lavisse et al.

(10) Patent No.: US 12,543,752 B2
(45) Date of Patent: *Feb. 10, 2026

(54) METHOD FOR DEHYDRATING LIQUID, SEMI-LIQUID OR PASTE-LIKE PRODUCTS, INCLUDING A PRESSURE CRYOGENIC STEP AND A LYOPHILIZATION STEP

(71) Applicant: GENIALIS, Henrichemon (FR)

(72) Inventors: Isabelle Desjardins-Lavisse, Henrichemont (FR); Guillaume Gillet, Salbris (FR)

(73) Assignee: Genialis, Henrichemont (FR)

( * ) Notice: Subject to any disclaimer, the term of this patent is extended or adjusted under 35 U.S.C. 154(b) by 950 days.

This patent is subject to a terminal disclaimer.

(21) Appl. No.: 17/597,370

(22) PCT Filed: Jul. 6, 2020

(86) PCT No.: PCT/FR2020/051196
§ 371 (c)(1),
(2) Date: Jan. 4, 2022

(87) PCT Pub. No.: WO2021/005268
PCT Pub. Date: Jan. 14, 2021

(65) Prior Publication Data
US 2022/0248723 A1 Aug. 11, 2022

(30) Foreign Application Priority Data
Jul. 5, 2019 (FR) ...................................... 1907562

(51) Int. Cl.
| | | |
|---|---|---|
| *A23B 2/92* | (2025.01) | |
| *A23B 2/88* | (2025.01) | |
| *A23B 2/91* | (2025.01) | |
| *A23L 33/105* | (2016.01) | |
| *A61K 8/02* | (2006.01) | |
| *A61K 8/35* | (2006.01) | |
| *A61K 8/9728* | (2017.01) | |
| *A61K 8/9794* | (2017.01) | |
| *A61K 8/99* | (2017.01) | |

(52) U.S. Cl.
CPC .................. *A23B 2/92* (2025.01); *A23B 2/88* (2025.01); *A23B 2/91* (2025.01); *A23L 33/105* (2016.08); *A61K 8/0241* (2013.01); *A61K 8/35* (2013.01); *A61K 8/9728* (2017.08); *A61K 8/9794* (2017.08); *A61K 8/99* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 9,017,746 B2* | 4/2015 | Desjardins-Lavisse ..................... A23B 2/88 | |
| | | | 426/11 |
| 2002/0028252 A1* | 3/2002 | Costantino ........... A61K 9/1688 | |
| | | | 424/501 |
| 2017/0049126 A1 | 2/2017 | Braithwaite | |
| 2019/0133150 A1 | 5/2019 | Lee et al. | |

FOREIGN PATENT DOCUMENTS

| | | |
|---|---|---|
| CN | 109156511 A | 1/2019 |
| CN | 108676721 B | 11/2020 |
| EP | 0201698 A1 | 11/1986 |
| EP | 2199258 B1 | 5/2017 |
| ES | 2194558 B1 | 3/2005 |
| KR | 10-2011-0007128 A | 1/2011 |
| KR | 20-2011-0007128 | 7/2011 |
| KR | 10-2018-0028233 | 3/2018 |
| KR | 20200011192 A * | 7/2018 |
| KR | 10-2019-0005308 A | 1/2019 |
| KR | 10-2019-0071382 A | 6/2019 |
| WO | 01/28525 | 4/2001 |
| WO | 2008/043909 A2 | 4/2008 |
| WO | 2018/049179 A1 | 3/2018 |
| WO | 2019/234341 A1 | 12/2019 |

OTHER PUBLICATIONS

International Search Report for International Application No. PCT/FR2020/051196 dated Oct. 2, 2020, 3 pages.
International Written Opinion for International Application No. PCT/FR2020/051196 dated Oct. 2, 2020, 8 pages.

* cited by examiner

*Primary Examiner* — Celeste A Roney
(74) *Attorney, Agent, or Firm* — TraskBritt (57) ABSTRACT

Products in dry powder form are obtained by lyophilization. More particularly, a lyophilization method includes a prior step of cryogeny under pressure of a matrix containing dissolved gas. A powder may be obtained by this method and used in food processing, cosmetics, pharmacy, and human and animal health.

15 Claims, 8 Drawing Sheets

METHOD FOR DEHYDRATING LIQUID, SEMI-LIQUID OR PASTE-LIKE PRODUCTS, INCLUDING A PRESSURE CRYOGENIC STEP AND A LYOPHILIZATION STEP

CROSS-REFERENCE TO RELATED APPLICATIONS

This application is a national phase entry under 35 U.S.C. § 371 of International Patent Application PCT/FR2020/051196, filed Jul. 6, 2020, designating the United States of America and published as International Patent Publication WO 2021/005298 A1 on Jan. 14, 2021, which claims the benefit under Article 8 of the Patent Cooperation Treaty to French Patent Application Ser. No. 1907562, filed Jul. 5, 2019.

TECHNICAL FIELD

The present disclosure relates to the field of products in dry powder form obtained by lyophilization. The present disclosure relates more particularly to a lyophilization method comprising a prior step of cryogeny under pressure of a matrix containing dissolved gas. It also relates to the powder obtained by this method as well as the uses thereof in food processing, cosmetics, pharmacy, and human and animal health.

BACKGROUND

Lyophilization is a method of dehydration by sublimating water under temperature and pressure conditions allowing the water contained in solid form in the products to be transformed directly into water vapor for elimination. The method therefore involves treating products that have previously been frozen, so that the water contained is solid. This freezing generally takes place around 0° C. A lower temperature may be necessary depending on the composition of the product (presence of sugar or salt in food preparations, for example). Lyophilization is carried out at temperatures considered to be low (below−20° C.), allowing the degradation of the organoleptic properties of the products and of the active ingredients they contain to be limited. However, the first step, freezing or deep-freezing, causes alterations that it would be desirable to reduce.

There are a large number of patent applications in the field of lyophilization. In fact, around 28,000 patent applications have been filed since Jan. 1, 2018. This strong patent filing activity demonstrates the strategic importance of the field at the global level. The economic challenges are considerable, in particular, with the growing worldwide demand for natural products without denaturing the active ingredients with the drying method. Lyophilization is recognized as the most respectful method for sensitive raw materials.

The innovations described in recent patents can be classified into 3 categories and relate to the method itself for:
1) reducing the residual moisture level (e.g., KR20190005308A);
2) allowing greater drying efficiency, in particular, to reduce time (e.g., KR20180028233A) and energy (e.g., WO2018049179A1) necessary for processing;
3) offering cryoprotectants to ensure better preservation of cells and activities (e.g., CN108676721A).

In order to improve drying, large industrial groups and SMEs have made very heavy investments (several hundreds of thousands or even millions of euros) to have the most efficient drying systems.

In the deep-freezing step prior to lyophilization, there are significantly fewer innovations. Patent KR20190005308A proposes a modification of the lyophilization method so as to reduce the final water content contained in the products, while patent CN109156511A proposes to carry out the vacuum deep-freezing step so as to improve the quality and stability over time of lyophilized jackfruit.

Document KR2019/0071382 describes a method for producing a lyophilized food having improved functional health properties by increasing the content of active ingredients, such as vitamins in fruits or vegetables, using cryogenic cooling and freezing. The method is characterized by the steps of: bringing a dried product containing fruits or vegetables into contact with a liquefied gas cooled to −190 to −80° C. for 0.5 to 30 minutes to cool the product cryogenically; supplying the dried material that has been cooled to a vacuum dryer and vacuum drying at room temperature; immersing vacuum-dried material in nutrient solution; and lyophilizing the dried food immersed in the nutrient solution at a temperature of −50 to −20° C. to prepare a lyophilized food.

Document US2019/133150 describes a method for producing a powder containing proteins. This method comprises the steps of: providing a protein-containing raw material; freezing the protein-containing raw material between −196° C. and −80° C.; and grinding the protein-containing raw material to obtain the protein-containing powder, wherein an average particle size of the protein-containing powder is smaller than a cell size of the protein-containing raw material.

Among A the solutions proposed to produce beads or granules of cryogenized products, application WO2008/043909 discloses a method implementing two successive steps consisting in dissolving gas in a more or less viscous liquid matrix by bringing the matrix into contact with an atmosphere whereof the partial gas pressure is greater than 2 bars and then cryogenizing, under the same pressure conditions as during the first step, the matrix containing the gas dissolved dropwise in a cryogenic fluid in liquid state. The advantage of this method lies mainly in the properties imparted to the final product, both during its storage and during its re-use. The imparted properties, for example, include the development of protection against oxidation during storage on the one hand and the formation of foam during reheating on the other hand.

Furthermore, document WO2019/234341 describes a method for obtaining a product in the form of frozen granules, particles or beads, from a liquid, semi-liquid or paste-like matrix, comprising the steps of gasifying the matrix by dissolving a gas, dispensing the matrix in the form of drops and cryogenizing the matrix drops by immersion in a cryogenic fluid.

Other solutions have also been proposed in the past or even today for producing beads or granules of cryogenic products. Patent application US2017/049126 illustrates the general principles of these methods, in which the beads or granules are formed by flow from a shower, then drop into a cryogenic fluid before being extracted therefrom by a sieve or a filter. The cryogenic fluid can be set in motion by gravity flow or using a pump, for example.

Lyophilization is a long and expensive method that consumes considerable energy. Moreover, none of the cryogenic solutions proposed to date have made it possible to significantly improve the properties of the lyophilized products. In particular, most of the proposed solutions are based on a vacuum applied during the freezing phase and no technique has envisaged the application of an excess pressure during this step.

There is a real need to have a more efficient and less expensive method for preparing lyophilized products that can be industrialized.

BRIEF SUMMARY

A new method has been developed for preparing dehydrated products in which a gas is dissolved in the matrix before deep freezing by pressurizing and the deep-freezing step prior to lyophilization is also carried out under pressure.

More specifically, the present disclosure relates to a method for preparing a dehydrated product comprising:
  a) providing a product in the form of a liquid, semi-liquid or paste-like matrix;
  b) dissolving a gas in the matrix by passing through an area dense in gas molecules, such a density being obtained (i) either by the gas flow generated by the evaporation of a cryogenic fluid, (ii) or by an increase in pressure, (iii) or by a combination of the two;
  c) cryogenizing the gas-rich matrix obtained in step b) at a pressure allowing the dissolved gas to be maintained in order to obtain frozen granules, particles or beads;
  d) lyophilizing the granules, particles or beads; and
  e) obtaining the dehydrated product in powder form.

The present disclosure also relates to a powder obtained according to the method as described herein that exhibits very advantageous properties, as well as the uses of such a powder in sectors such as food processing, cosmetics, pharmacy, and human and animal health.

The present disclosure also relates to equipment for implementing the method comprising a cryogenic chamber in which a pressure greater than or equal to atmospheric pressure is maintained and lyophilizing equipment.

The present disclosure aims to remedy the existing problems by proposing a method and associated equipment for making it possible to obtain a product in dehydrated form; this method involves dissolving a gas in a liquid, semi-liquid or paste-like matrix by passage through a gas flow and/or pressurization, then deep freezing this matrix via a deep-freezing method under pressure in contact with a cryogenic fluid, so as to maintain the gas in large quantity in the matrix. The frozen matrix is then lyophilized. The cryogenic step under pressure allows substantial improvements both in terms of drying and of the properties of the products produced.

Compared with the lyophilization of products carried out conventionally, lyophilizing cryogenized beads rich in dissolved gas has a certain number of technical benefits.

First of all, the preparation time is much shorter. Cryogenics is an almost instantaneous method, making it possible to produce balls of initially fluid product continuously and at high rates (several hundred kg per hour on standard equipment). The time saving is considerable compared to freezing in a cold room, even if the latter operates at very low temperatures (−40° C. to −80° C. in general). The cryogenized beads are extracted from the materials producing them at temperatures generally between −80° C. and 120° C., which makes it possible to start lyophilization directly, with products whose temperature is around −60° C., without a prior cooling step.

More surprisingly, the lyophilization time itself is very greatly reduced (down to a factor of at least 2). The duration of the method as a whole is significantly reduced.

With regard to the product, using the method according to the present disclosure makes it possible to obtain products in the form of high-quality powder, without the "edge/core effect" usually obtained when the lyophilization is carried out on product plates, which induces a drying gradient and damaged matrices on the exteriors of the plates (usually called "cake"). On the contrary, the spherical shape of the frozen matrix and the presence of gas allow homogeneous dehydration without alteration; the product is therefore of better quality. Also, very surprisingly, the lyophilized powders obtained from cryogenized products containing dissolved gas are much more porous than those obtained from conventionally frozen products.

The quality of the dehydrated products is therefore higher than that of the lyophilized products obtained by a conventional method because the conditions used in this method are on the whole gentler, less aggressive, and less destructuring for the matrix.

Furthermore, regardless of the pressure applied and after lyophilization, the cryogenized beads containing dissolved gas make it possible to obtain a fine powder, which can be handled simply because it is able to be measured and is not sticky. The resulting powder does not pick up moisture easily when left under ambient conditions. Conversely, the lyophilization of conventionally frozen products only makes it possible to obtain product agglomerates, which must generally be reprocessed (by grinding, for example) to facilitate or even allow their use. Here, the powders are very fine, are of very low apparent density and do not require grinding before use. If necessary, they can be compacted for ease of use.

Another advantage of the dehydrated powders according to the present disclosure is that they dissolve quickly and leave no deposit. The method according to the present disclosure and the equipment used also allow improved preservation of the integrity of the starting matrix, in particular, in terms of its physicochemical properties. With regard, in particular, to powders for food use, the organoleptic properties are significantly improved compared to the lyophilized products obtained by the methods of the prior art.

In an advantageous embodiment where the gas is an inert gas and, more particularly, is not oxygen, oxidation reactions are avoided. In fact, the inert gases, once dissolved in the matrix, protect the integrity of the structures and preserve the properties of the matrices, in particular, the organoleptic properties of the food matrices and the living properties of the cellular matrices.

BRIEF DESCRIPTION OF THE DRAWINGS

FIG. 9: Schematic diagram of the method used showing the effects of pressure and gas dissolution/release in the product, a. preparation of the product at atmospheric pressure; b. gas dissolution in the product, partial pressure Pp of the dissolved gas being the sum of the pressure of the enclosure Pe1 and the local pressure linked to a gas flow Pf1; c. cryogenics of the product containing the dissolved gas, operating at a pressure Pc greater than or equal to partial pressure Pp of the gas contained in the product, the pressure Pc itself being able to result from the combination of a chamber pressure Pe2 and the local pressure linked to a gas flow Pf2; d. possible storage of the product in the form of solid beads at atmospheric pressure and at a temperature below the melting point of the product; e. lyophilization under partial vacuum, resulting in the sublimation of the water contained in the product and the release of the gas trapped therein, causing the creation of a microporous structure in the solid product beads; f. storage of the powder obtained at the end of lyophilization, after any crushing of the dry microporous beads.

The arrows represent the gas that is applied to the surface of the product in step b., which remains in equilibrium in step c. and which escapes in step e.

DETAILED DESCRIPTION

A first object of the present disclosure relates to a method for preparing a dehydrated product comprising:
a) providing a product in the form of a liquid, semi-liquid or paste-like matrix;
b) dissolving a gas in the matrix by passing through an area dense in gas molecules, such a density being obtained (i) either by the gas flow generated by the evaporation of a cryogenic fluid, (ii) or by an increase in pressure, (iii) or by a combination of these two means;
c) cryogenizing the gas-rich matrix obtained in step b) at a pressure allowing the dissolved gas to be maintained in order to obtain frozen granules, particles or beads;
d) lyophilizing the granules, particles or beads;
e) obtaining the dehydrated product in powder form.

The pressure making it possible to keep the gas dissolved in the matrix during the cryogenic step is generally a pressure greater than or equal to atmospheric pressure.

The dissolved gas can be an inert gas such as nitrogen, argon, helium, etc., or another gas such as oxygen or $CO_2$, for example, used in sparkling drinks, or nitrous oxide, used for its foaming power. It is also possible to use a mixture of gases depending on the desired properties. The use of inert gas is preferred when it is desired to avoid oxidation of the matrix, and therefore to preserve the properties of the starting matrix.

Within the meaning of the present disclosure, "area dense in gas molecules" or "area dense in molecules" means an area in which the number of molecules per unit of volume is higher than that which would be observed at atmospheric pressure. Since this volume is not closed and can, in particular, constitute a sub-unit of a larger volume, the high number of molecules found there does not necessarily translate into a visible increase in the pressure of the assembly. It is also possible to consider it as a local but non-measurable pressure, the latter being constituted by the combination of the possible pressure applied to the assembly and the effect induced by the density of molecules generated.

When the area dense in gas molecules is obtained owing to a gas flow generated by the evaporation of a cryogenic fluid, the quantity of gas dissolved in the matrix depends on the control of the flow and is typically equivalent, when no pressure is applied, to that which would be obtained by the application of relative pressures between 0.001 bars and 2 bars. A particularly preferred cryogenic fluid in this case is liquid nitrogen.

When the area dense in gas molecules is obtained by increasing the pressure, this pressure is greater than atmospheric pressure, and may, in particular, be greater than 0.5 bar, 1 bar, 2 bars, 5 bars, 10 bars, 50 bars, 100 bars, 200 bars, even 250 bars or more. In a particular embodiment, it is between 2 and 100 bars.

In a preferred embodiment, the area dense in molecules is obtained at least in part owing to a gas flow generated by the evaporation of a cryogenic fluid. It can be obtained by combining the evaporation of a cryogenic fluid with an increase in pressure; this condition corresponds to the combination of the two means of dissolving the gas in the matrix mentioned in (iii) of step b) of the method.

Within the meaning of the present disclosure, "under pressure" means conditions that allow the dissolution of a gas in a matrix and/or the maintenance of the gas dissolved in the matrix during deep freezing. Pressurization can be obtained either by increasing the pressure or by bringing the matrix into contact with a cryogenic fluid, the evaporation of this gas creating a gas molecules density equivalent to pressurization so that the gas molecules dissolve in the matrix. The increase in pressure can also be obtained by a movement of gas creating a local pressure. In addition, putting "under pressure" corresponds to the application of relative pressures, that is to say, atmospheric pressure is considered to be a pressure of 0 bar. All the pressures expressed in this document are relative pressures, and the method is not carried out under partial vacuum.

Thus, step b) takes place at a relative pressure sufficient to allow gas to dissolve in the matrix, and an equivalent pressure is maintained in step c) to keep the dissolved gas inside the matrix during cryonics.

With regard to the implementation of the method as a whole, it is possible to link the stages of the method one after the other and, in particular, to carry out the lyophilization stage immediately after the cryogenics stage. In addition, the method can be carried out continuously. It is also possible to keep the product in frozen form at the end of step c) and to carry out the lyophilization subsequently, after a negative cold storage time to keep the products in the solid state (for example, at −20° C.). In both cases, the advantages of the method are retained.

Thus, according to alternative embodiments, the lyophilization step d) can be carried out either immediately following the cryogenic step c), or subsequently after storage of the frozen granules, particles or beads.

The conditions of the method can be adapted according to the product to be dehydrated, in particular, the pressure during the cryogenic step, and the lyophilization parameters. Those skilled in the art will know how to make such adaptations.

The product to be dehydrated can be any type of liquid, semi-liquid or paste-like matrix. It is preferably a natural matrix, for example, a plant juice, a plant must, a fruit or vegetable juice, or a plant root.

In a preferred embodiment, the product to be dehydrated in the form of a liquid, semi-liquid or paste-like matrix comprises *spirulina*, turmeric, truffle or ginger. In a preferred embodiment, the matrix contains only *spirulina*, turmeric, truffle or ginger. In such an embodiment, the gas used will preferably be an inert gas such as liquid nitrogen.

A second object of the present disclosure relates to a dehydrated powder capable of being obtained by a method as defined above.

The powder according to the present disclosure is obtained by the method described above. Combining deep freezing under pressure of a matrix in which a gas has been dissolved beforehand and lyophilization imparts new properties to the dehydrated powder thus obtained.

Remarkably, the powder according to the present disclosure is defined by the presence of spherical particles. Spherical particles represent a significant fraction of these particles. Thus, the spherical particles represent at least 25% of the powder, or even 30%, 40%, 50%, 60%, 75% or more. This characteristic differentiates this powder from the powders of the prior art.

Another advantageous property is the fineness of the powder, which is linked to a particle size of less than 30 microns without grinding the powder. In a particularly preferred embodiment, the size of the particles is less than 20 microns. In a very particular embodiment, it is less than 10 microns. These sizes are typically determined by optical microscopy.

In a particular embodiment, the powders according to the present disclosure may therefore be characterized by the presence of spherical particles, the size of which is less than 30 microns.

This powder also has other properties that differentiate it from products lyophilized by a conventional deep-freezing-lyophilization method. Indeed, it is less dense and dissolves more easily. The solubilization rate is remarkably increased compared to an equivalent product obtained by a conventional deep-freezing-lyophilization method, in particular, at room temperature. The powder also has a color different from that of a powder obtained by a conventional method; it is clearer overall. All these characteristics testify to a preparation that is more respectful of the raw material, and has gentler and less destructuring conditions. These properties are shown in the experimental section.

In addition, with regard to food products, the method according to the present disclosure allows products to be prepared with significantly increased organoleptic properties compared to equivalent products obtained by a conventional deep-freezing-lyophilization method.

It should be noted that although the product is characterized by a low density, it can be compacted to facilitate its use (introduction into soft capsules for nutritional or pharmaceutical applications, compaction to reduce the volume of packaging for food products, etc.).

Thus, the present disclosure also relates to a powder in compacted form so as to reduce the volume of the product.

In a particular embodiment of the present disclosure, the powder comprises *spirulina*, turmeric, truffle or ginger. In a preferred embodiment, it contains only *spirulina*, turmeric, truffle or ginger.

A third object of the present disclosure relates to the use of a powder as defined above in food processing, cosmetics, pharmacy, and human or animal health.

The properties of the new powders obtained make it possible to envisage their use in many fields where they will advantageously replace the powders used to date.

A powder according to the present disclosure can be used in food processing to flavor food preparations or as colorants. It is particularly advantageous because of its preserved organoleptic properties and its high solubility.

It can be used in cosmetics as an active ingredient, as colorants or as flavorings.

It can be used in pharmacies, in particular, in compacted form. The powder is fine and uniform, which is a guarantee of quality and processability. It preserves the properties of raw materials for optimum efficiency. In addition, it dissolves easily in a drink for a drinkable formulation or after ingestion for formulation as a tablet to swallow.

It can also be used in human or animal health for the formulation of active ingredients or principles, in particular, of natural origin, owing to the fact that the properties of the raw materials are altered little or not at all by the dehydration method. In addition, the high solubilization capacity is favorable to good bioavailability of the active ingredients. By way of example, mention may be made of *spirulina*, which is used, in particular, to combat fatigue and stress and to strengthen immunity.

It is understood that different powders obtained by the method of the present disclosure can be compacted together and optionally with other supports, depending on the desired dosage form.

A fourth object of the present disclosure relates to equipment for implementing the method as defined above and comprising:
- means for dispensing a liquid, semi-liquid or paste-like matrix;
- a receptacle containing a cryogenic fluid in which the matrix is received to be cryogenized therein and transformed into frozen granules, particles or beads;
- a matrix passage area located between the means for dispensing the matrix and the receptacle;
- a means for generating an area dense in gas molecules in the passage area, the means being either (i) a gas flow generated by the evaporation of a cryogenic fluid, or (ii) a pressurization means, (iii) or a combination of these two means;
- lyophilizing equipment for transforming the frozen granules, particles or beads in the form of dehydrated powders.

In a general configuration of the equipment, the area dense in molecules or passage area of the matrix is situated above the receptacle containing a cryogenic fluid.

Figure 9:
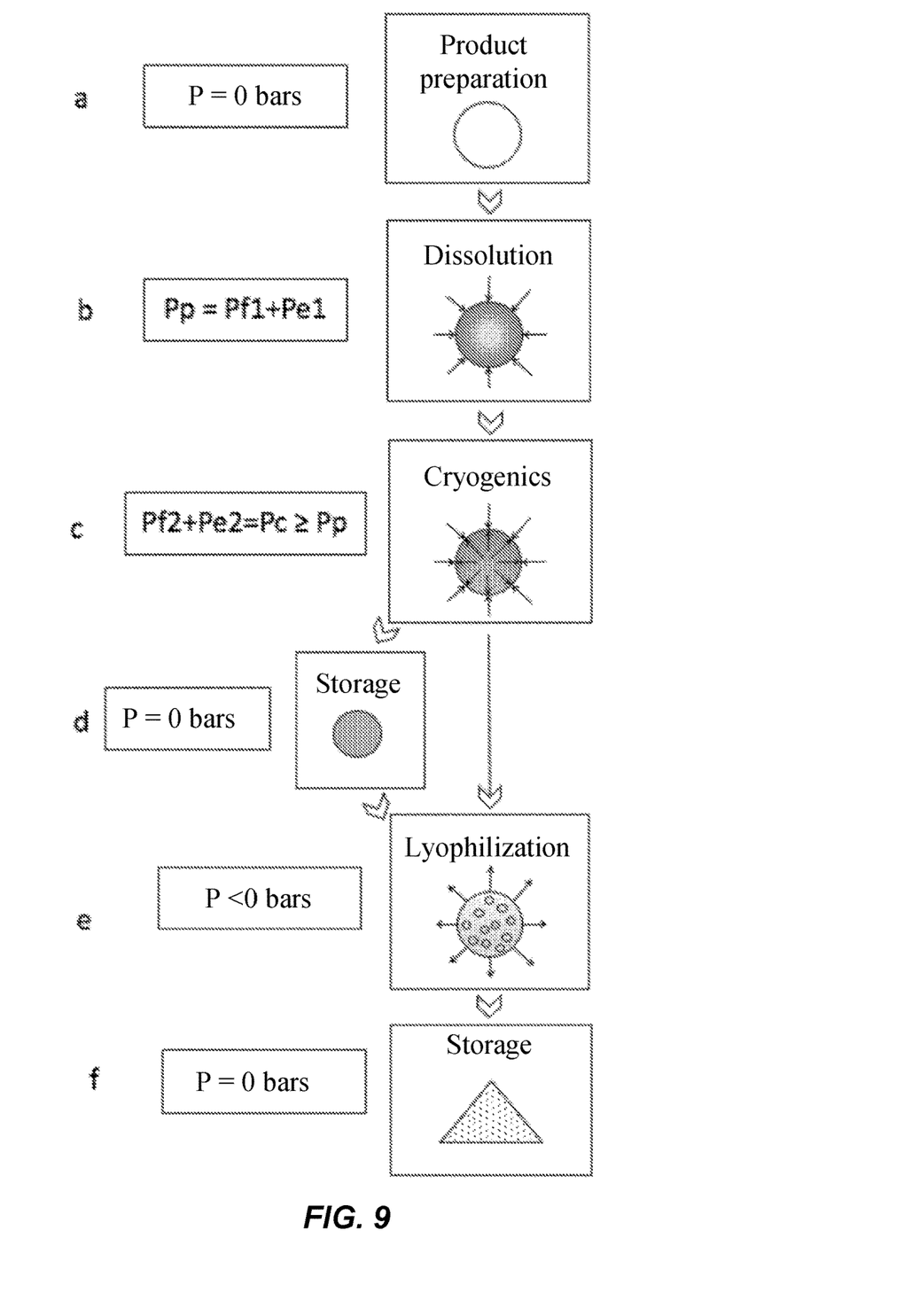

FIG. 9 illustrates an embodiment of the present method in which the area dense in gas molecules is generated by the combination of a flow of a gas and a pressurization of a chamber.

The present disclosure will be better understood on reading the examples that follow, which are provided by way of illustration and should in no case be considered as limiting the scope of the present disclosure.

EXAMPLES

EXAMPLE 1: Implementation of the Method According to the Present Disclosure 1.1. General description of the method The method according to the present disclosure involves dissolving a large quantity of a gas in a matrix, cryogenizing the matrix in the form of granules or beads, and then lyophilizing the matrix.

The gas dissolution and cryogenics steps can be carried out in two distinct ways:

- either by incorporating gas at a pressure greater than atmospheric pressure, then by carrying out rapid freezing using cryogenic fluid, as described in application WO2008/043909;
- or by incorporating gas by immersion in a cryogenic fluid; in this embodiment, the step of gasifying the matrix comprising dissolving a large quantity of the gas generated by the evaporation of a cryogenic fluid in a matrix so that the product is at least saturated with the gas, the dissolution being carried out by increasing the number of gas molecules in an area of high gas density, called a "high molecular density area," located above the surface of the cryogenic fluid and on the path of the matrix drops before their immersion in the fluid, the high molecular density area being created by carrying out the gasification and cryonics of the gasified matrix within a closed chamber provided with a vent arranged to allow evacuation of the gas generated by the evaporation of the cryogenic fluid by natural convection and to keep the interior of the enclosure at a pressure greater than or equal to atmospheric pressure;
- or by incorporating gas by immersion in a cryogenic fluid while applying a pressure greater than atmospheric pressure.

The matrices rich in gas and in the form of frozen granules, particles or beads are then subjected to lyophilization according to conventional conditions. On leaving the lyophilizing equipment, dehydrated beads a few millimeters in diameter are obtained. These very easily turn into powder, simple friction causing the very porous structure of the obtained beads to crumble.

1.2. Special experimental conditions

The experimental conditions implemented to cool the samples analyzed in the examples that follow are as follows:

- Conventional freezing in a cold room, grinding and then spreading the pieces on the trays of the lyophilizing equipment; this condition is called "Reference,"
- Cryogenics under low pressure (corresponds to a relative pressure equivalent to approximately 0.5 bars obtained by bringing into contact with a cryogenic fluid), to dissolve a small quantity of gas but still benefit from the shape and temperature advantages of the cryogenics method "under pressure," then directly spreading the obtained beads on the trays of the lyophilizing equipment. This condition is called "Cryo LP" for Low Pressure.
- Cryogenics under 5 bars of pressure, then spreading of the obtained beads directly on the trays of the lyophilizing equipment; this condition is called "Cryo MP," for Medium Pressure.

1.3. Matrix preparation a/Coffee

For the tests carried out on coffee, the matrix was prepared from a preparation of 3 L of filtered coffee, separated into 3 batches of 1 L each and then subjected to cooling as described above.

b/Turmeric

For the tests on turmeric, the matrix was prepared from a turmeric juice obtained by entraining and grinding the roots of the plant between two endless screws enclosed in an eight-shaped tube. For 1 kg of roots, approximately 750 g of juice is obtained. The latter was then subjected to the method that is the subject of the present disclosure without further intermediate treatment.

c/*Spirulina*

For the *spirulina* tests, 200 g of a *spirulina* paste (fresh seaweed collected, drained and pressed) was diluted in 800 g of water containing 2 g/L of salt. The preparation was then subjected to the method that is the subject of the present disclosure without further intermediate treatment.

EXAMPLE 2: Reduction in Method Execution Time

The method according to the present disclosure allows dehydrated products to be prepared in a shorter time than the deep-freezing-lyophilization method of the state of the art.

First of all, the sample preparation time is reduced, since pressurized cryogenics is an instantaneous method, unlike freezing and cryogenics methods without applied pressure. The product can then be lyophilized directly, without a prior cooling step, since the temperature of the products is about −60° C. when entering the lyophilizing equipment.

Figure 1:
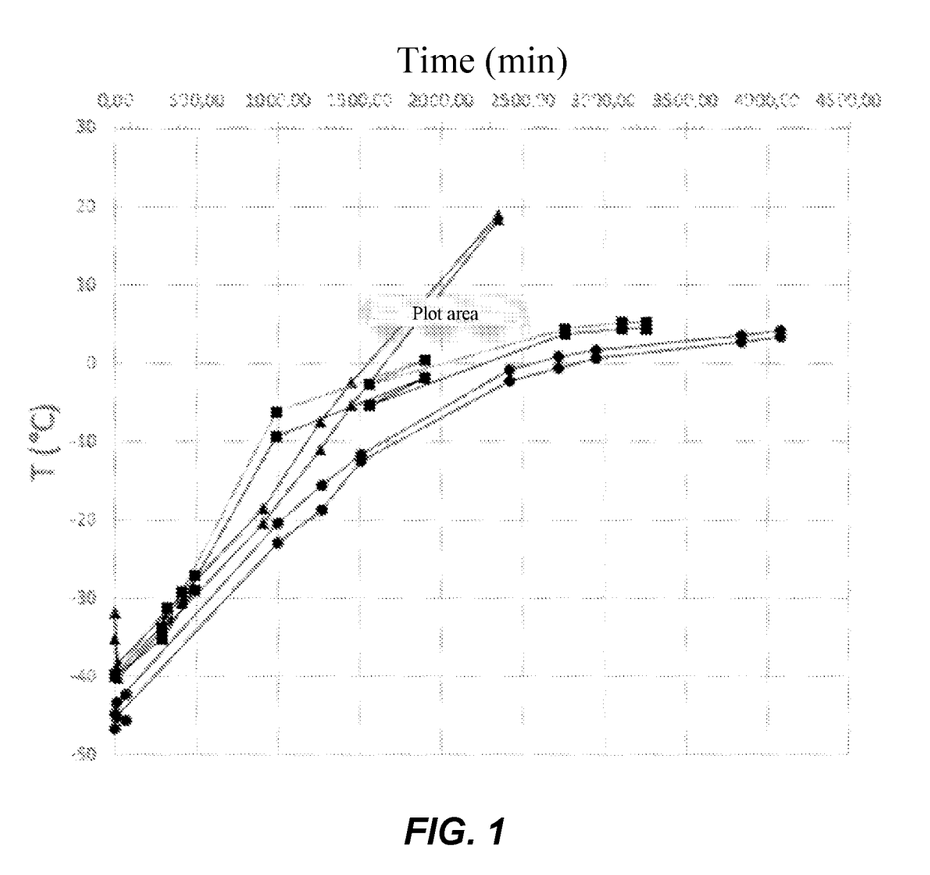
FIG. 1: Represents the lyophilization kinetics observed for the 3 preparation conditions. Circle: Reference; Triangle: Cryo LP; Square: Cryo MP.

The time required to obtain a lyophilized product was studied. The result is shown in FIG. 1.

These are three coffee samples prepared by applying the particular experimental conditions described in paragraph 1.2.

First of all, it is observed that the time required to extract all the available water is halved when cryogenics Cryo under 5 bars (MP) is used, compared to the use of conventional freezing (Reference). This time savings is considerable. It is also observed that cryogenics Cryo under low pressure (LP) also induces an interesting benefit, although less significant.

EXAMPLE 3: Physicochemical Properties of the Powders

The properties of the powders obtained by the method according to the present disclosure were then compared with those of powders obtained by a conventional method (Reference).

3.1. General observations

It is observed that regardless of the pressure applied, the cryogenized beads containing dissolved gas (Cryo LP and cryo MP) make it possible to obtain a fine powder, which can be handled simply because it can be measured and is not sticky. The resulting powder does not pick up moisture easily when left under ambient conditions.

Conversely, the Reference lyophilization only makes it possible to obtain product agglomerates, which must generally be reprocessed (by grinding, for example) to facilitate or even allow their use.

3.2. Powder density

Very surprisingly, the lyophilized powders obtained from cryogenized products containing dissolved gas (Cryo LP and Cryo MP) are much less dense than those obtained from conventionally frozen products.

Table 1 above shows the density measurements carried out on the coffee powders obtained under the three different conditions.

TABLE 1

Apparent density of coffee powders without settling

| Method | Powder density |
|---|---|
| Reference | 1.15 |
| Cryo LP | 0.78 |
| Cryo MP | 0.40 |

It is observed that the Cryo MP powder is almost 3 times less dense than the Reference powder, which is considerable.

3.3. Observations of the particles in optical microscopy

Figure 2:
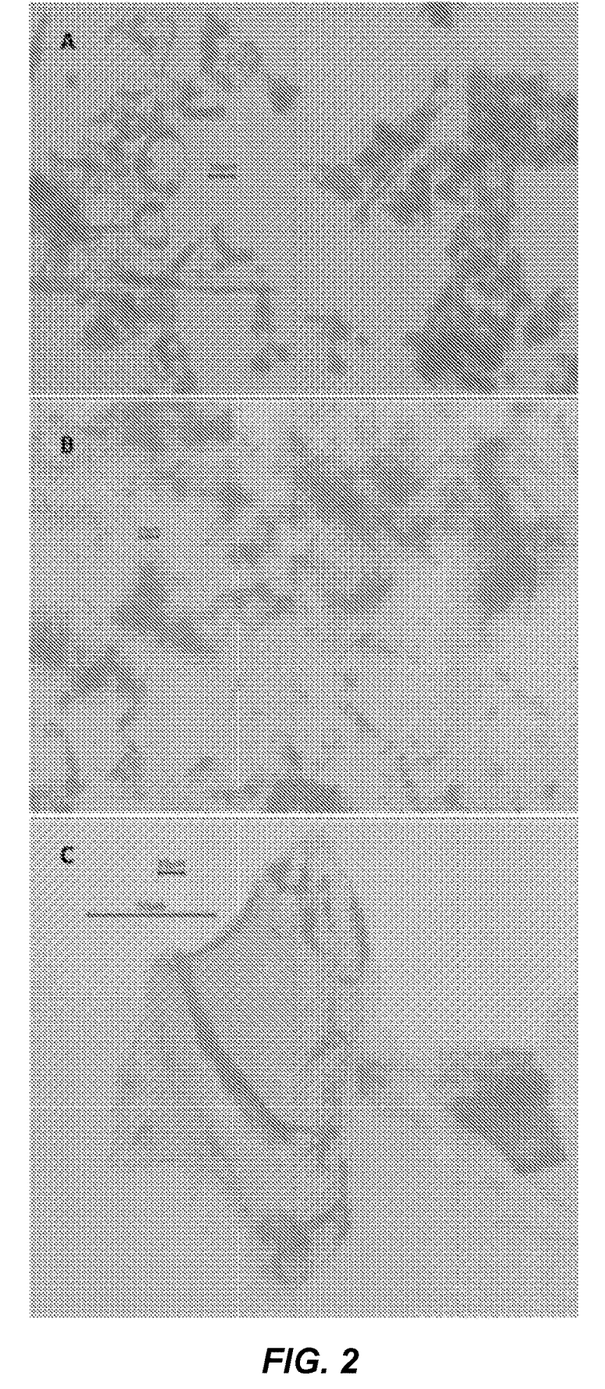
FIG. 2: Microscopic observations made on the three coffee powders according to the preparation conditions; A: lyophilized coffee particles obtained under cryo LP condition; B: lyophilized coffee particles obtained under Cryo MP condition; C: lyophilized coffee particles obtained under conventional conditions (reference freezer-20° C.).

These measurements could also be correlated with microscopic observations made on the three coffee powders, obtained under the three experimental conditions.

Reproductions of these microscopic observations are shown in FIG. 2.

Surprisingly, although the frozen beads are non-porous (the incorporated gas is dissolved and allows the product to retain its "full," non-porous structure), a release of nitrogen takes place during lyophilization, which allows the formation of small, very porous particles. The more the quantity of dissolved gas increases, the greater the porosity. The method under pressure thus produces a powder of very low apparent density (see Table 1) that does not require grinding (the dehydrated beads are reduced to powder by simple crumbling or crushing).

The powder can still be easily compacted if necessary (e.g., pharmaceutical applications).

3.4. Dissolution rate

Observations of particle sizes can be correlated with differences in the rate of dissolution of the obtained powders in water. The hot rehydration being very fast (a few seconds), dissolution kinetics were carried out at 22° C. to be more discriminating.

3.4.1. Dissolution of a coffee powder

The rehydration times of preparations at 1% of coffee are shown in Table 2 below. For each preparation condition, 1 g of lyophilized coffee is poured into 99 g of demineralized water stirred using a magnetic stirrer (IKA Lab Disk model set at 160 rpm). The measured rehydration time is that necessary so that no more solid grains are visible in the solution.

TABLE 2

Rehydration in distilled water at 22° C. of 1 g of coffee in 99 g of water

| Sample | Rehydration time |
|---|---|
| Reference Coffee | 1'53" |
| Cryo LP Coffee | 1'23" |
| Cryo MP Coffee | 58" |

These results show that the rehydration is almost 2 times faster for the Cryo MP samples compared to that of the Reference samples. This is explained by a lower density of the lyophilized powder, which leads to greater porosity and therefore an accentuated capillary effect allowing faster hydration.

Figure 3:
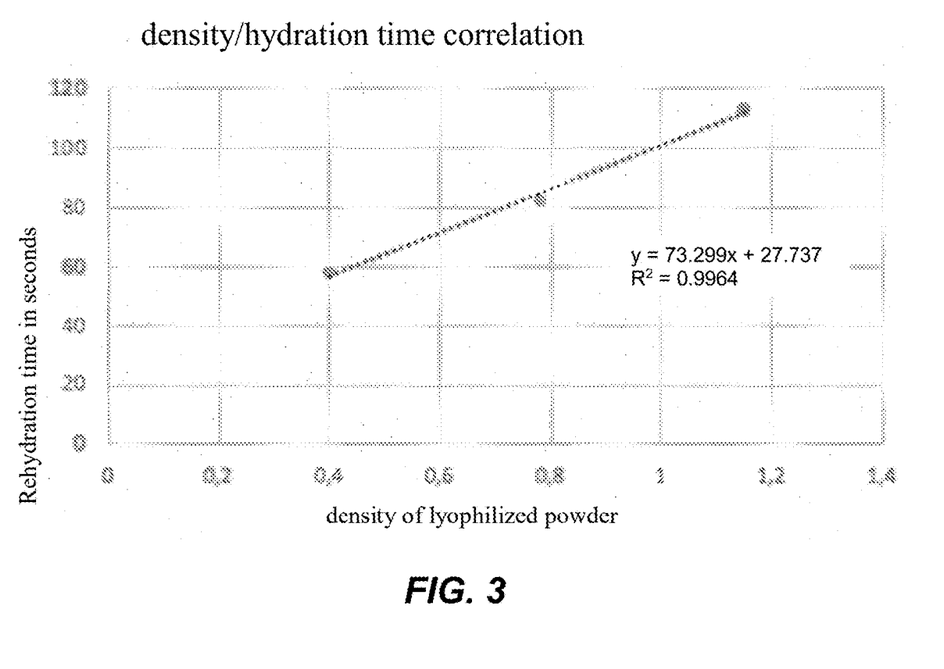
FIG. 3: Correlation between powder density and rehydration time of coffee powders.

This correlation is shown in FIG. 3.

This correlation was not expected, as very low-density powders generally experience difficulties with rehydration. They tend to float more easily on the surface of the liquid, water in our case, without dissolving there. In the case of the present disclosure, this correlation is most certainly explained by the aspects of crystal size, illustrated in FIG. 2, which in turn induce these variations in apparent densities.

3.4.2. Dissolving a turmeric powder

Turmeric is used as a food ingredient in many preparations and recipes. Its solubility is a major problem for its addition in aqueous preparations.

The method according to the present disclosure allows a turmeric powder to be obtained that is very easily dispersible in food. An experiment for dissolving a powdered commercial turmeric and turmeric prepared by the "cryo MP" method was carried out.

Stirring for one minute was carried out for the 2 products in distilled water at 22° C. After stirring, visually, the "pressurized Cryo" product is very well dispersed or even very significantly solubilized. The industrial product is only very slightly solubilized.

Figure 4A:
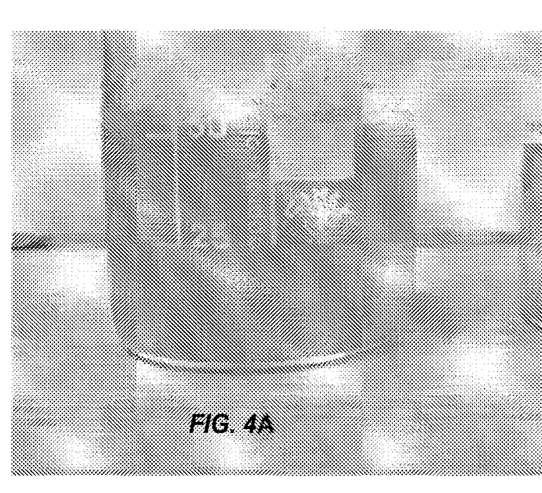
FIGS. 4A and 4B: Dissolution of "cryo MP" turmeric (FIG. 4A) and industrial turmeric (FIG. 4B), stirred for 1 minute, then left to stand for 10 minutes.
Figure 4B:
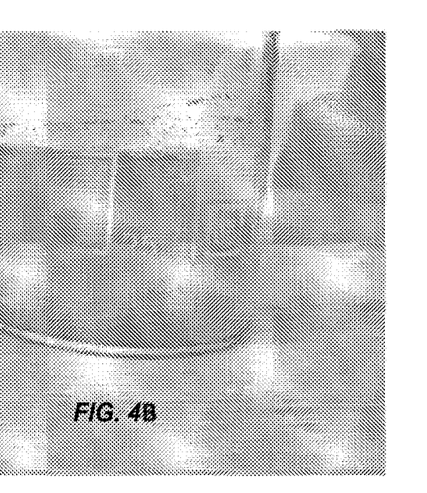

To demonstrate the differences in solubilization, the 2 products are left to stand for 10 minutes. The photo reproduced in FIGS. 4A and 4B shows that the method described in this patent produces a very homogeneous solution (FIG. 4A), while the industrial product is not solubilized at all and the turmeric is deposited at the bottom of the beaker (FIG. 4B).

EXAMPLE 4: Organoleptic properties of the powders

The organoleptic properties were then studied.

The olfactory profile of each coffee was determined by double ultra-rapid gas phase chromatography (Heracles II electronic nose, AlphaMos). To do this, 0.01 g of each sample was taken in a 20 ml vial and placed at 40° C. for 1 hour to allow the release of the aromas, which are then analyzed automatically. Each analysis is repeated 3 times.

4.1. Electronic nose analysis

Figure 5:
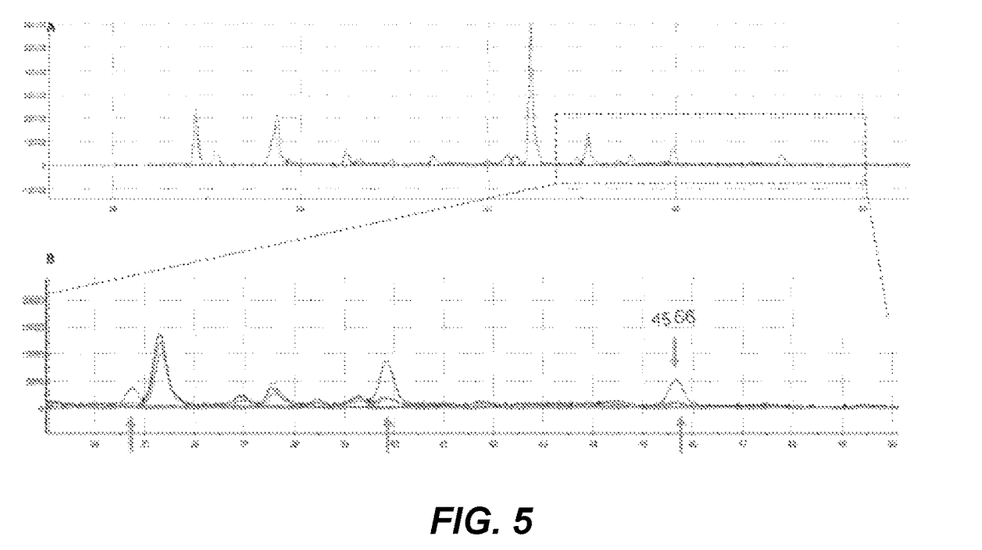
FIG. 5: Chromatograms obtained following analysis by an electronic nose of the three powders obtained after lyophilization (Reference conditions, Cryo LP and Cryo MP). In graph B: the first peak marked with an arrow comes out at 34.73, corresponds to 2.5 dimethylpyrazine, IP=70.99; the second peak marked with an arrow comes out at 39.29, corresponds to trimethylpyrazine, IP=48.51; the third peak marked with an arrow comes out at 45.66, corresponds to (E, Z)-2.6-nonadienal, IP=35.36.

Three analyses (in triplicate) were performed on each sample and the average chromatograms are presented in FIG. 5.

We note that the profiles of the 3 preparations (frozen reference, cryogenized LP and MP) show the same aroma peaks. The LP cryogenic coffee even has 3 additional peaks at retention times of 35 s, 40 s and 46 s. Overall, we also notice that the intensity of the detected peaks is higher for the products cryogenized under pressure compared to the Reference. This results in a better olfactory intensity during the rehydration of the coffee (cf. sensory analysis).

Very surprisingly, the organoleptic properties of the products obtained from cryogenized products containing dissolved gas (cryo LP and cryo MP) under pressure are much less altered than those obtained under Reference conditions from conventionally frozen products (Cref). In particular, the tastes and aromas are much better preserved in the case where cryogenics under pressure (LP or MP) is used.

Two remarkable phenomena are observed. First, the peak intensity is lower for the Reference (graph A, FIG. 5, lower curves), regardless of the peak. The highest intensity is most often obtained for Cryo LP conditions. In graph B, FIG. 5, it is also observed that certain peaks are very pronounced for Cryo LP (peak highlighted by the arrows), while they are very slight or even absent in the other two cases. Analysis of the molecules responsible for these peaks indicates that they are most likely known aromatic molecules of freshly roasted coffee. These molecules are all available from purified flavor molecule suppliers to enhance the taste of coffee and other food preparations. It is therefore very interesting that these molecules are "naturally" more present in the preparations obtained by means of the method that is the subject of the present disclosure.

These results show the greatest aromatic potential of the lyophilized coffees obtained according to the method that is the subject of the present disclosure.

4.2. Principal Component Analysis

A Principal Component Analysis (PCA) is performed on the different coffee samples to assess their overall olfactory rendering by the electronic nose.

Figure 6:
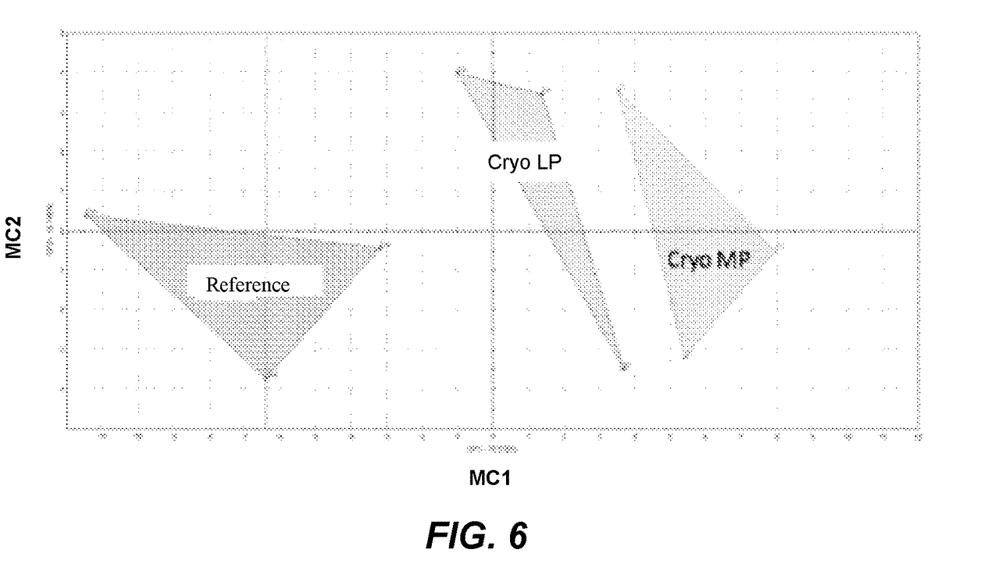
FIG. 6: PCA analysis on the olfactory profiles of the 3 coffees (Frozen reference; Cryo LP and Cryo MP).

The results are shown in FIG. 6.

This overall analysis leads to obtaining a discrimination index between the samples of 62, which is significant. More than 75% of this discrimination index can be explained by the difference in area between the peaks (represented by the main component 1, denoted MC1).

The Euclidean distances between samples are shown in Table 3.

TABLE 3

Euclidean distance between samples

| Compared Samples | Euclidean distance | Significance |
|---|---|---|
| (Cryo LP - Cryo MP) | 4.8 | $p < 0.001$ |
| (Cryo LP - Reference) | 8.84 | $p < 0.001$ |
| (Cryo MP - Reference) | 12.72 | $p < 0.001$ |

Euclidean distances are significant between pressurized cryogenic coffees and the frozen Reference. The products are very significantly different. Cryogenics under pressure produces coffees with aromatic profiles that are different from conventional deep freezing. The higher the pressure, the greater the distance. Overall, the increase in pressure increases the olfactory intensity of coffees.

This is a completely surprising result and validates the interest of using cryogenics under pressure.

4.3. Sensory analysis of coffees 45 people were asked to compare the 3 coffees (prepared according to the Reference, Cryo LP and Cryo MP conditions as previously described), to detect whether differences exist between the 3 coffees and, if differences exist, to classify them in order of preference.

The "reference" coffee was detected as being significantly different from the other 2 coffees by 93% of the tasters. This coffee was detected 76% of the time as "less aromatic" than the other two.

The two Cryo LP and Cryo MP coffees were detected as different by 61% of the tasters. This difference is therefore less appreciable than the difference between cryogenic coffees and the Reference. Among the tasters who judged the 2 cryogenic coffees to be different, 64% preferred the Cryo MP coffee because of a "more marked aromatic development."

This analysis shows that the method described here produces a coffee that is different from a conventional freezing method (Reference) and that in the case of a coffee, increasing the pressure in the method improves the aromatic quality of the coffee.

EXAMPLE 5: Powder colors

The color of the coffee powders was analyzed as a function of the three preparation conditions described above.

The colorimetric analyses were carried out using a Data-Color Konica-Minolta colorimeter according to the standardized measurement procedure in the L, a, b reference system. The results are shown in Table 4.

TABLE 4

Colorimetric analyses of coffee powders according to the L, a, b standard.

| Method | L | a | b |
|---|---|---|---|
| Cryo MP | 79.25 | 11.14 | 27.07 |
| Cryo LP | 73.75 | 11.55 | 23.65 |
| Reference | 64.42 | 8.23 | 11.83 | standard.

The measurements show that the "luminance L" (also called "clarity") increases with the quantity of dissolved gas and therefore when the density of the powder decreases. The coffee cryogenized under 5 bars of pressure and then lyophilized has a distinctly lighter shade (higher luminance) than the other samples.

Figure 7:
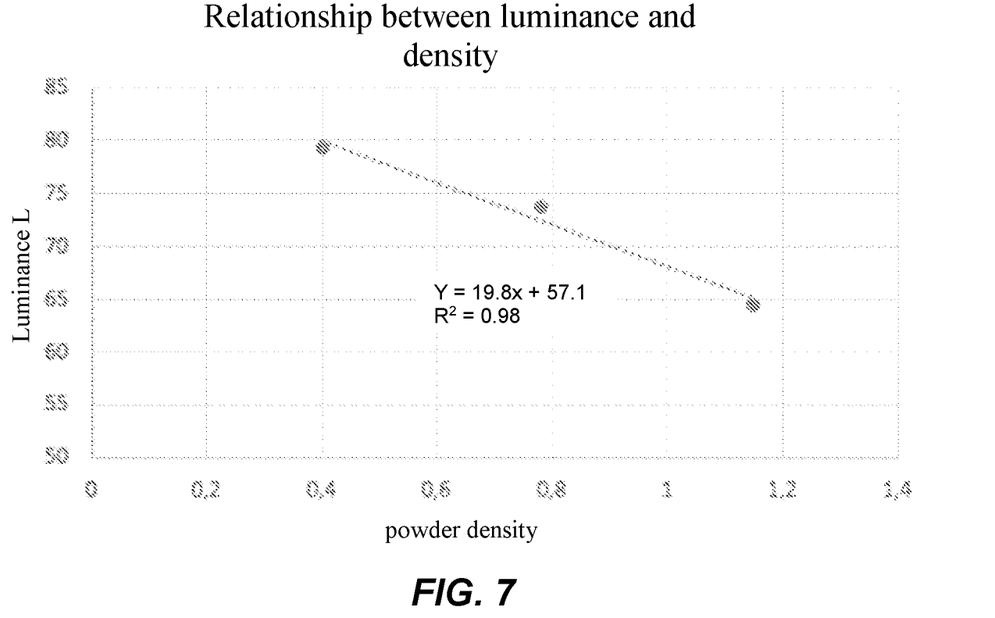
FIG. 7: Correlation between densities and luminances of 3 lyophilized coffee powders.

This relationship between density and luminance is validated in FIG. 7, which shows the strong correlation ($R2=0.98$) that exists between the densities and luminances of the 3 lyophilized coffee powders.

For the color factors (a and b), it appears that the Cryo MP and Cryo LP methods lead to similar values, while the Reference freezing method provides a less red (parameter a) and less yellow (parameter b) powder than the other 2 cryogenic powders. The color difference $\Delta E^*$ between the Reference and the Cryo MP powder is highly significant ($\Delta E^*=21.46$). This significant difference in color allows the identification of cryonically pressurized powders.

These results are an additional indicator of the difference in the quality of the coffee powder depending on the lyophilization methods implemented.

In conclusion, coffees prepared under pressure, according to the method of the present disclosure, are clearer, more aromatic, and dissolve better than coffee prepared according to the Reference method. These properties are due to the method and, as shown by the results obtained with turmeric, are generally applicable to all types of products.

EXAMPLE 6: Thermal property of the powders

The thermal characterization measurements of the 3 coffee powders were carried out by modulated DSC (Differential Scanning Colorimetry).

Figure 8:
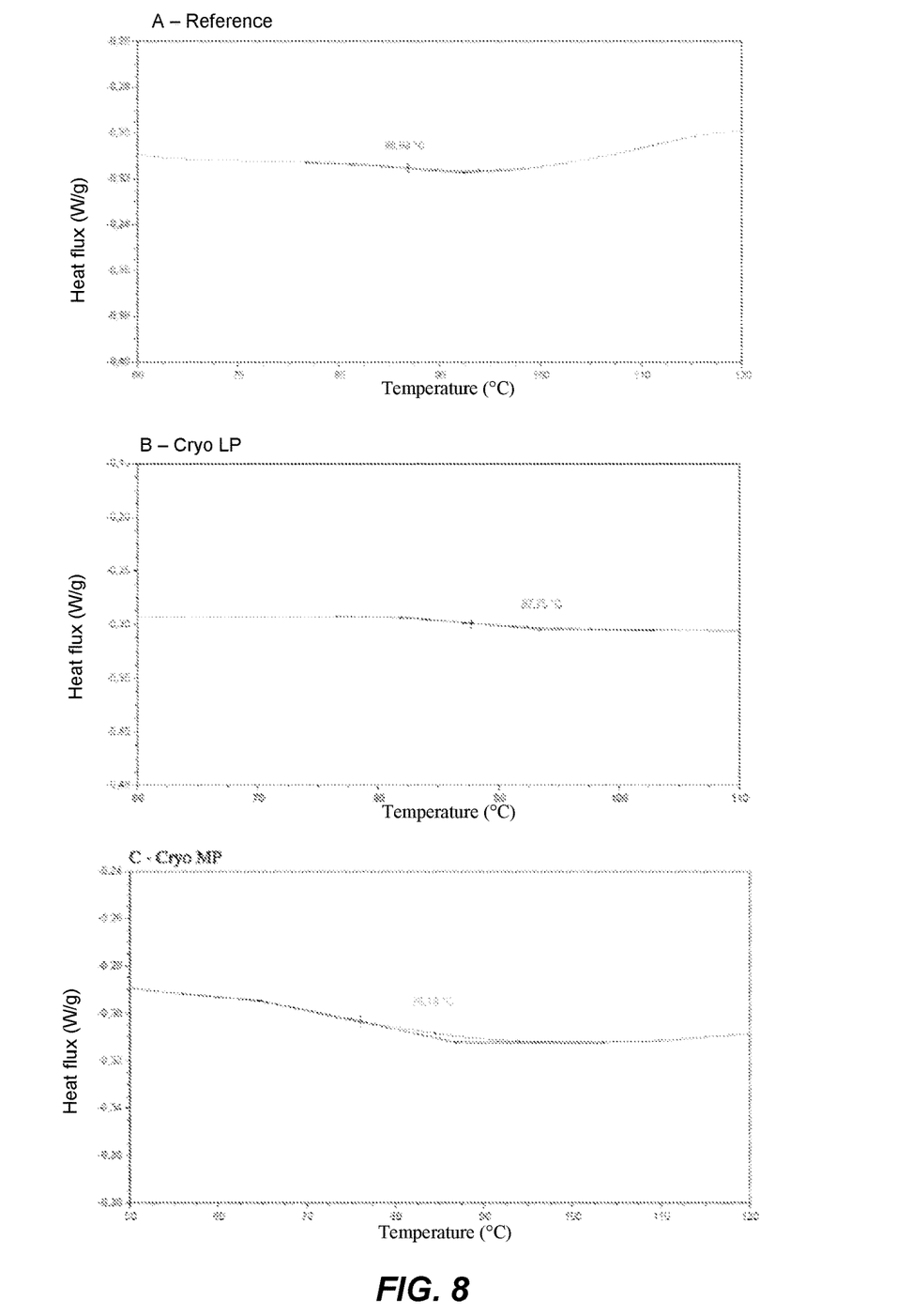
FIG. 8: Thermal characterization of coffee powders by modulated DSC.

The results are shown in FIG. 8.

These results show a glass transition of the lyophilized coffees under the Reference conditions and under very similar Cryo LP conditions. Conversely, there is a very significant difference (around 10° C.) for the Cryo MP method. This reflects a change in structure modifying the transition area of the product to lower temperatures. Indeed, since the composition is the same and in the absence of water, this reduction can only be due to a different molecular organization with more interactions in the Reference and Cryo LP systems. The molecules are freer and more mobile (fewer interactions) in the Cryo MP method.

EXAMPLE 7: Preservation of active principles present in the matrix

Figure 10:
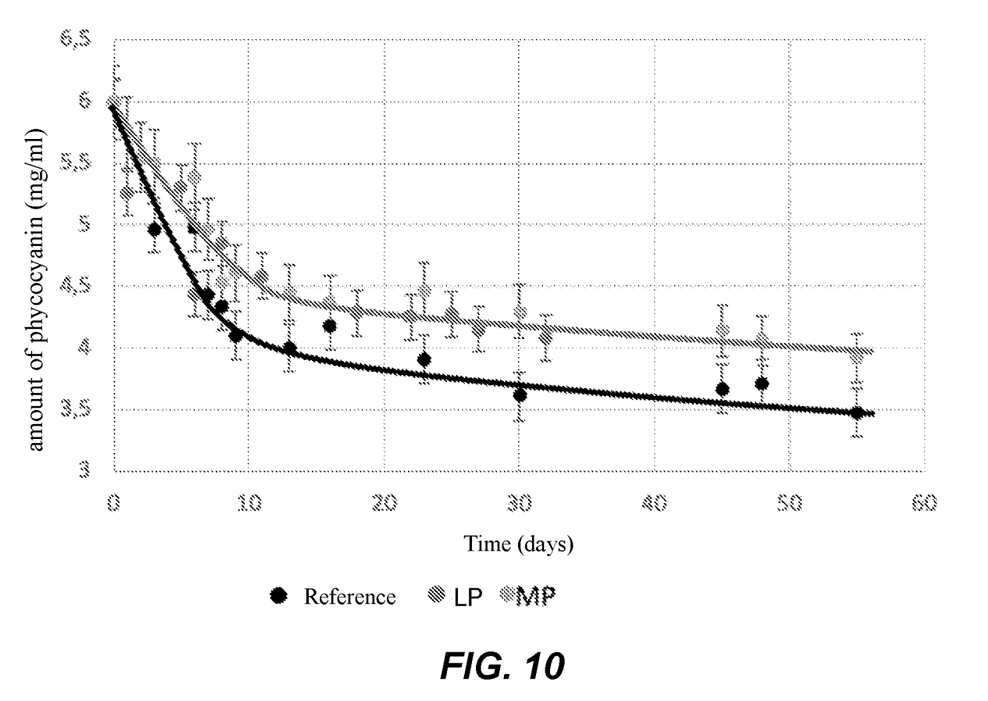
FIG. 10: variation of the quantity of phycocyanin-C during storage of lyophilized *spirulina* powder.

Powdered *spirulina* samples, treated according to the three protocols described in point 1.2, were stored over time, at room temperature, and measurements of the amount of phycocyanin C were carried out at regular intervals by spectrophotometry, after rehydration of the samples and lysis of the cells by sonication. The results are shown in FIG. 10.

It is observed that the quantity of phycocyanin C decreases during storage for all the samples. However, the amount remains greater in the samples treated according to the present disclosure (LP and MP) than in the samples treated conventionally (Reference). Interestingly, the results are comparable regardless of the pressure applied under the two conditions presented.

The method according to the present disclosure therefore makes it possible to conserve and preserve active agents in dry and stable form over time, in a much more efficient manner than what can be obtained by conventional freezing, then lyophilization.

The invention claimed is:

1. A method for preparing a dehydrated product, comprising:
   a) providing a product in the form of a liquid, semi-liquid or paste-like matrix;
   b) dissolving a gas in the matrix by passing the matrix through an area dense in gas molecules, such a density being obtained (i) either by the gas flow generated by the evaporation of a cryogenic fluid, (ii) or by an increase in pressure, (iii) or by a combination of these two processes;
   c) cryogenizing the gas-rich matrix obtained by the dissolving of the gas in the matrix at a pressure allowing the dissolved gas to be maintained to obtain frozen, non-porous granules, particles or beads;
   d) lyophilizing the granules, particles or beads with a release of the dissolved gas which allows formation of small, very porous particles; and
   e) obtaining the dehydrated product in powder form.

2. The method of claim 1, wherein the lyophilization of the granules, particles or beads is carried out either immediately following the cryogenizing of the gas-rich matrix, or subsequently after storage of the frozen granules, particles or beads.

3. The method of claim 1, wherein the gas is an inert gas.

4. A dehydrated powder formed by the method of claim 1.

5. The dehydrated powder of claim 4, wherein the powder comprises spherical particles.

6. The powder of claim 4, wherein the powder comprises particles having a particle size less than 30 microns as measured by optical microscopy.

7. The powder of claim 4, wherein the powder is in compacted form.

8. The powder of claim 4, wherein the powder comprises *spirulina, curcumin, ginger or truffle*.

9. The method of claim 1, further comprising incorporating the dehydrated product in powder form in a food or in a cosmetic.

10. The method of claim 1, further comprising administering the dehydrated product in powder form to a human or an animal.

11. A system for implementing a method as recited in claim 1, the system comprising:
    a dispenser for dispensing a liquid, semi-liquid or paste-like matrix;
    a receptacle containing a cryogenic fluid in which the matrix is received to be cryogenized therein and transformed into frozen granules, particles or beads;
    a matrix passage area located between the dispenser for dispensing the matrix and the receptacle;
    means for generating an area dense in gas molecules in the passage area, the means being either (i) a gas flow generated by the evaporation of a cryogenic fluid, or (ii) a pressurization means, or (iii) or a combination of these two means; and
    lyophilizing equipment for transforming the frozen, non-porous granules, particles or beads into the form of a dehydrated powder comprising small, very porous particles.

12. The method of claim 1, wherein the powder comprises spherical particles.

13. The method of claim 1, wherein the powder comprises particles having a particle size less than 30 microns as measured by optical microscopy.

14. The method of claim 1, wherein the powder is in compacted form.

15. The method of claim 1, wherein the powder comprises *spirulina*, curcumin, ginger or truffle.

* * * * *